(12) United States Patent
Morita

(10) Patent No.: US 10,341,512 B2
(45) Date of Patent: Jul. 2, 2019

(54) IMAGE PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Hiroyasu Morita, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/145,225

(22) Filed: May 3, 2016

(65) Prior Publication Data
US 2016/0337537 A1    Nov. 17, 2016

(30) Foreign Application Priority Data
May 12, 2015  (JP) ................... 2015-097705

(51) Int. Cl.
G06F 15/00  (2006.01)
H04N 1/00  (2006.01)
H04N 1/44  (2006.01)
H04L 29/12  (2006.01)

(52) U.S. Cl.
CPC ..... H04N 1/00506 (2013.01); H04N 1/00411 (2013.01); H04N 1/00514 (2013.01); H04N 1/4413 (2013.01); H04N 1/4426 (2013.01); H04L 61/1594 (2013.01); H04N 2201/0094 (2013.01)

(58) Field of Classification Search
CPC ........... H04N 1/00506; H04N 1/00411; H04N 2201/0094; H04N 1/4413; H04N 1/4426; H04N 1/00514; H04L 61/1594

USPC ....................................................... 358/1.14
See application file for complete search history.

(56) References Cited

U.S. PATENT DOCUMENTS

| | | | |
|---|---|---|---|
| 7,589,857 B2 | 9/2009 | Oe | |
| 8,531,704 B2 | 9/2013 | Maruyama et al. | |
| 8,913,271 B2 | 12/2014 | Terao | |
| 8,970,866 B2 | 3/2015 | Terao | |
| 2005/0002057 A1* | 1/2005 | Oe | G06F 12/1458 358/1.15 |
| 2009/0237711 A1* | 9/2009 | Oku | H04N 1/00514 358/1.15 |

(Continued)

FOREIGN PATENT DOCUMENTS

| | | |
|---|---|---|
| CN | 101998007 A | 3/2011 |
| CN | 103248782 A | 8/2013 |
| JP | 2013106297 A | 5/2013 |

OTHER PUBLICATIONS

Office Action issued in Chinese Application No. 201610278206.X dated Apr. 4, 2018. English translation provided.

*Primary Examiner* — Saeid Ebrahimi Dehkordy
(74) *Attorney, Agent, or Firm* — Rossi, Kimms & McDowell LLP

(57) ABSTRACT

A plurality of address books including at least an address book for an administrator are stored in a storage unit, and it is determined, based on whether a request to display an address book is received via a screen of a transmission function or a request to display an address book is received via a screen of a transfer function, whether or not to display the address book for the administrator as a default from the plurality of address books stored in the storage unit.

9 Claims, 15 Drawing Sheets

(56) References Cited

U.S. PATENT DOCUMENTS

| | | | | |
|---|---|---|---|---|
| 2010/0063972 A1* | 3/2010 | Fujii | ................ | G06Q 10/00 707/748 |
| 2011/0128580 A1* | 6/2011 | Kazama | ............... | H04N 1/4413 358/1.15 |
| 2013/0201514 A1* | 8/2013 | Terao | ................ | H04N 1/00514 358/1.14 |
| 2014/0036298 A1* | 2/2014 | Kimura | ............... | H04N 1/4413 358/1.14 |

\* cited by examiner

F I G. 4
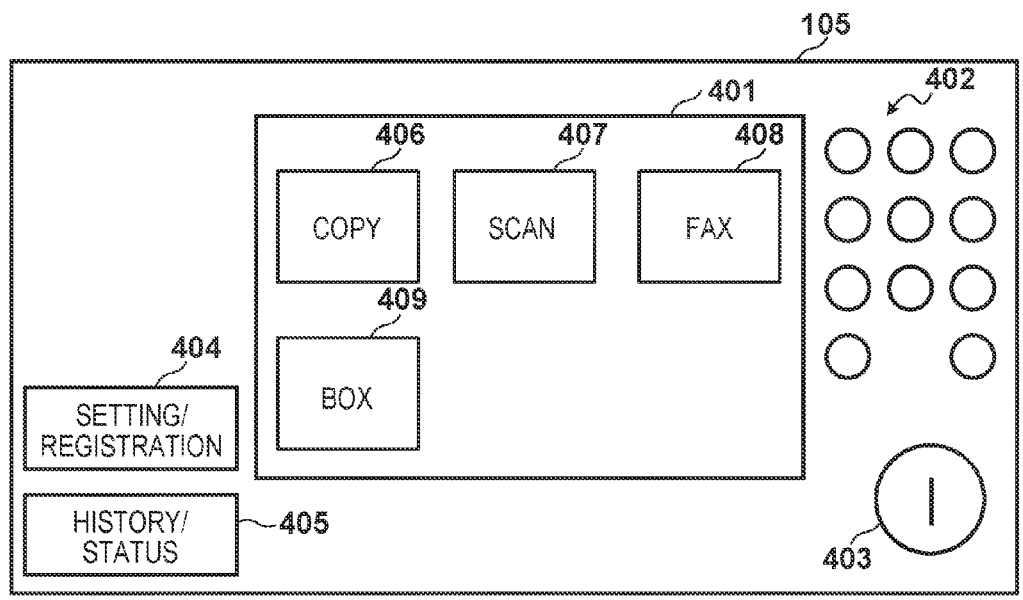
F I G. 5
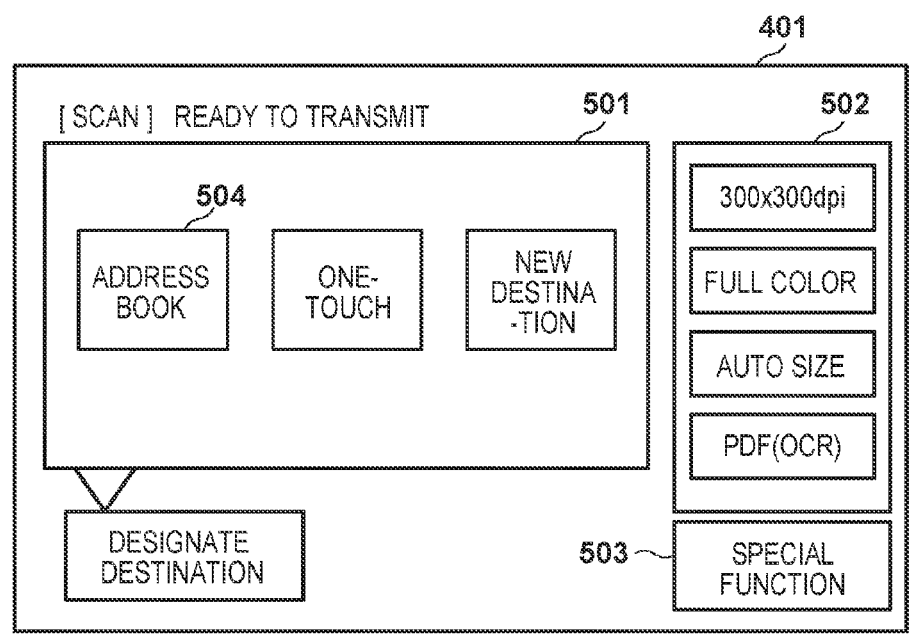

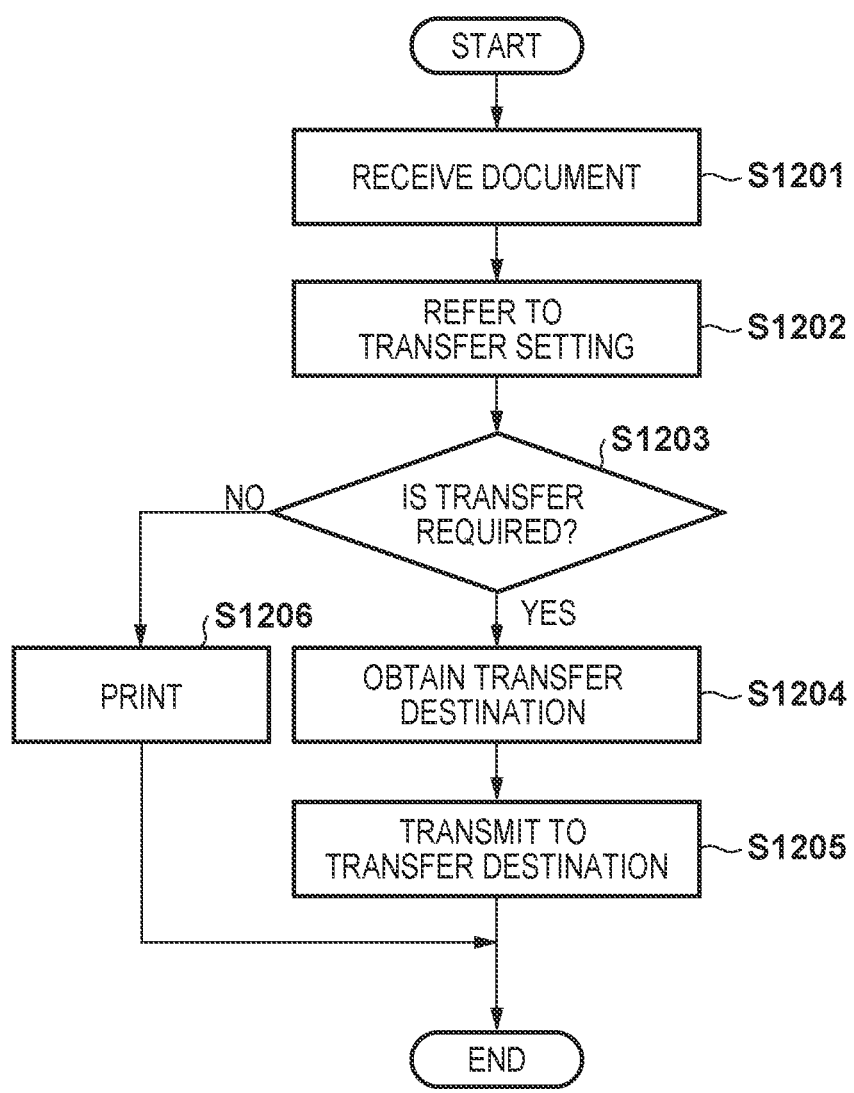

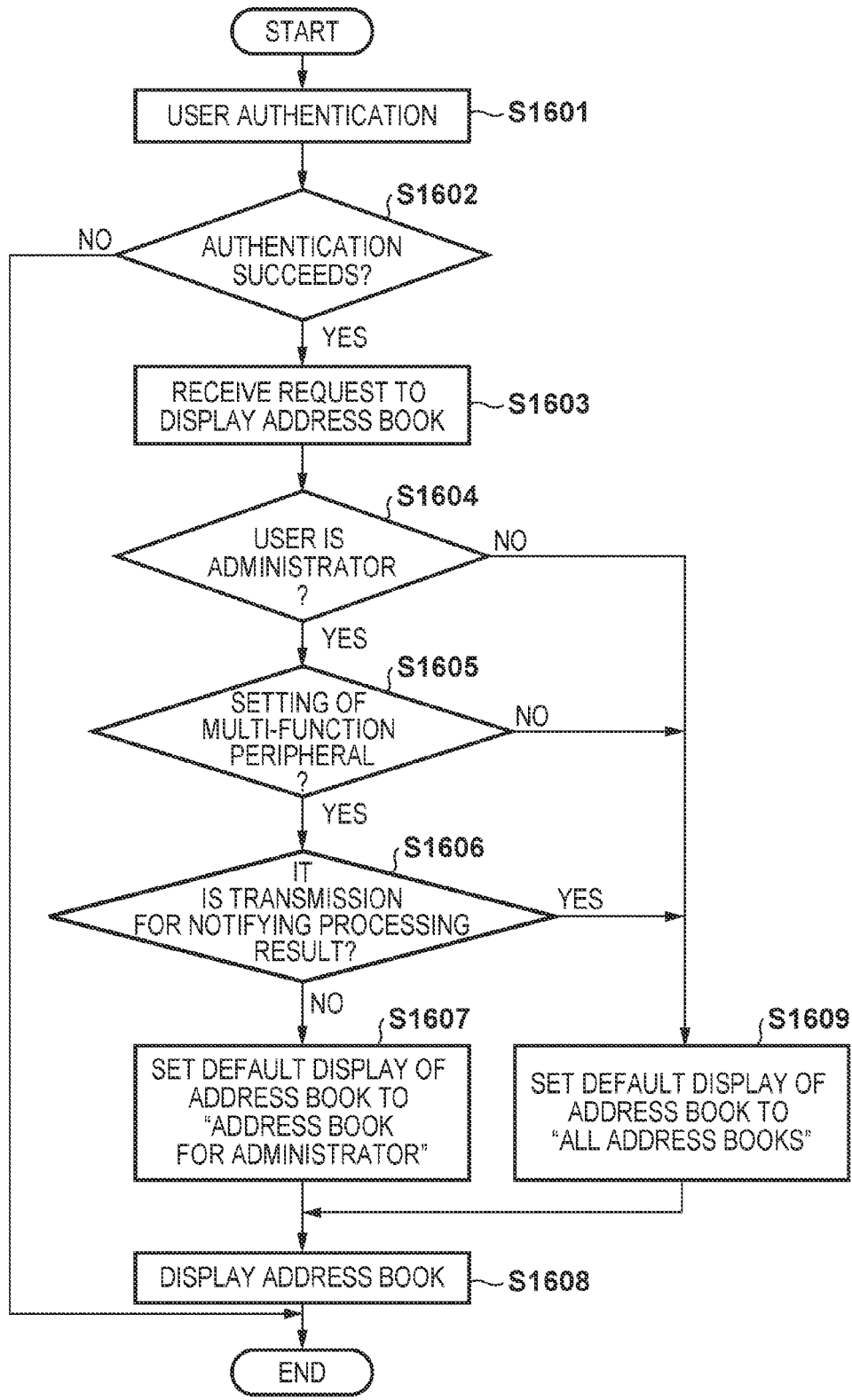

IMAGE PROCESSING APPARATUS, METHOD OF CONTROLLING THE SAME, AND STORAGE MEDIUM

BACKGROUND OF THE INVENTION

Field of the Invention

The present invention relates to an image processing apparatus, a method of controlling the same, and a storage medium.

Description of the Related Art

Conventionally, when a user uses a device, requesting of a user authentication is performed. In such a case, a user performs a user authentication using a touch panel or an IC card, and can use the device only after succeeding at the authentication.

Furthermore, in order to allow an improvement in operability or improvement in security, it is possible to use "a personal address book" by which destination information that is shared between conventional devices is made be to possible to manage for each user utilizing each user's authentication information. While a conventional address book (hereinafter, a common address book) can be used commonly by users that use the device, "a personal address book" can be used only by an authenticated user.

In such an environment, a destination which has high usage frequency for a user is often registered in a "personal address book" of the user. Also, from a perspective of security, a destination that is not desired to be published to another user is often registered to a "personal address book" similarly. For this reason, an image processing apparatus, in which it is possible to select whether only "the personal address book" is displayed to the user, or whether the destination registered in "the personal address book" is published to another user, in a device capable of using "the personal address book", has been proposed. (For example, refer to Japanese Patent Laid-Open No. 2013-106297).

On the other hand, transfer processing for transferring a document received by a device to another destination is conventionally performed. In such transfer processing, a received document matched to a transfer condition in accordance with a transfer setting registered in the device is transferred automatically to the designated transfer destination by the device. The setting of such a transfer condition and the setting of the transfer destination are often performed by the administrator. Also, the setting of transfer destination becomes easier by making the transfer destination selectable from the destinations of an address book registered in the device. Here, an "address book for the administrator" which cannot be edited by the general user is arranged so that a general user does not modify a transfer destination set by the administrator, and the destinations registered in such an address book are set as transfer destinations.

Also, even for the administrator of the device, there are cases where the administrator selects a destination registered in the address book of the administrator or newly registers a transmission destination to the address book of the administrator when performing a transmission by operating the device. In this way, in a case where the administrator operates the address book as a user, it is advantageous that rather than the address book for the administrator", the personal address book" of the administrator be displayed preferentially from a perspective of the operability.

However, in a case where the administrator operates an address book not to transmit for himself, but for a setting to a device such as a setting for transfer to the device, it is not desirable from a perspective of the operability that an operation screen of the device displays "the personal address book" of the administrator preferentially. This is because destinations that are used when the administrator transmits using the device are registered in "the personal address book" of the administrator, so it is advantageous that the "address book for the administrator" of the administrator be displayed upon a setting of the device. In this way, even for the same operator (administrator), when a registered address book is displayed when the operator operates the device, it is advantageous that the address book corresponding to the operator's operation which the operator is attempting to perform be displayed. However, switching the display of the address book in accordance with the operation purpose of the operator in this way has not been considered.

SUMMARY OF THE INVENTION

An aspect of the present invention is to eliminate the above-mentioned problems with the conventional techniques.

A feature of the present invention is providing an operation environment which is easy to operate for an operator by switching a display of an address book in accordance with a screen which has received a request to display the address book.

According to a first aspect of the present invention, there is provided an image processing apparatus having a transmission function for reading an original and transmitting image data of the read original, and a transfer function for receiving image data from an external apparatus and transferring the received image data, the image processing apparatus comprising: a storage unit configured to store a plurality of address books including at least an address book for an administrator; and a display control unit configured to determine, based on whether a request to display an address book is received via a screen of the transmission function or a request to display an address book is received via a screen of the transfer function, whether or not to display the address book for the administrator as a default from the plurality of address books stored in the storage unit.

According to a second aspect of the present invention, there is provided a method of controlling an image processing apparatus having a transmission function for reading an original and transmitting image data of the read original, and a transfer function for receiving image data from an external apparatus and transferring the received image data, the method comprising: storing in a storage unit a plurality of address books including at least an address book for an administrator; and determining, based on whether a request to display an address book is received via a screen of the transmission function or a request to display an address book is received via a screen of the transfer function, whether or not to display the address book for the administrator as a default from the plurality of address books stored in the storage unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 depicts a top view of a console unit of the multi-function peripheral according to the first embodiment.

FIG. 5 depicts a view illustrating an example of a scan operation screen displayed on the console unit by a user pressing a "scan" button in a screen of FIG. 4.

FIG. 12 is a flowchart for describing a process for transferring to a designated transfer destination document data received by the multi-function peripheral according to the first embodiment.

FIG. 16 is a flowchart for describing processing for displaying the address book in the multi-function peripheral according to the fourth embodiment.

DESCRIPTION OF THE EMBODIMENTS

Embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

Figure 1:
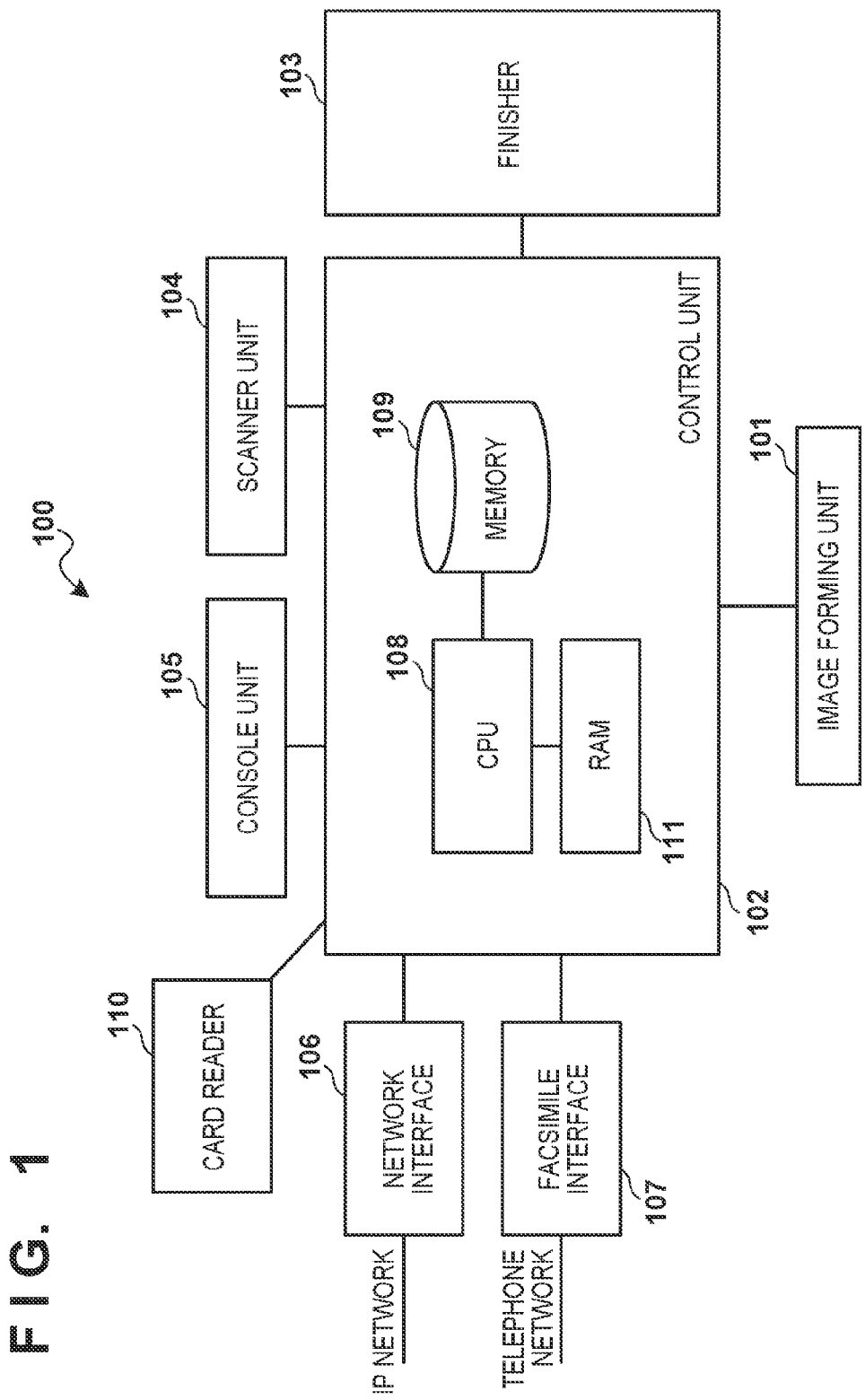
FIG. 1 is a block diagram for explaining a configuration of a multi-function peripheral (MFP) as one example of an image communication apparatus according to a first embodiment of the present invention.

FIG. 1 is a block diagram for explaining a configuration of a multi-function peripheral (MFP) 100 as one example of an image communication apparatus according to the first embodiment of the present invention.

The multi-function peripheral 100 has an image forming unit 101 for forming (recording) an image on a sheet by a recording method such as an electrophotographic method, and a control unit 102 for controlling operations of the multi-function peripheral 100. Also, the multi-function peripheral 100 has a finisher 103 for performing post-processing such as stapling processing, a scanner unit 104 for reading an original, generating and outputting image data of the original, and a console unit 105 for inputting various data and commands and displaying messages. Also, the multi-function peripheral 100 has a network interface (I/F) 106 for transmitting/receiving image data through a network, a facsimile interface 107 for transmitting/receiving facsimile data, and a card reader 110 for authenticating a user that uses the device. Each of these is connected to the control unit 102 through respective dedicated interfaces. In a case where a user authentication is performed using the card reader 110, the user has his dedicated card for authentication, and it can be discriminated whether or not the user is permitted to use the multi-function peripheral 100 by the card read by the card reader 110.

Also, the control unit 102 has a central processing unit (CPU) 108, a storage unit (memory) 109, a RAM 111, and the like. The CPU 108 executes later explained processing by deploying a program installed in the memory 109 into the RAM 111 and executing the program. Also, a control program of a setting dialog box described later, content in which operation screen information is described and the like, are stored in the memory 109.

Figure 2:
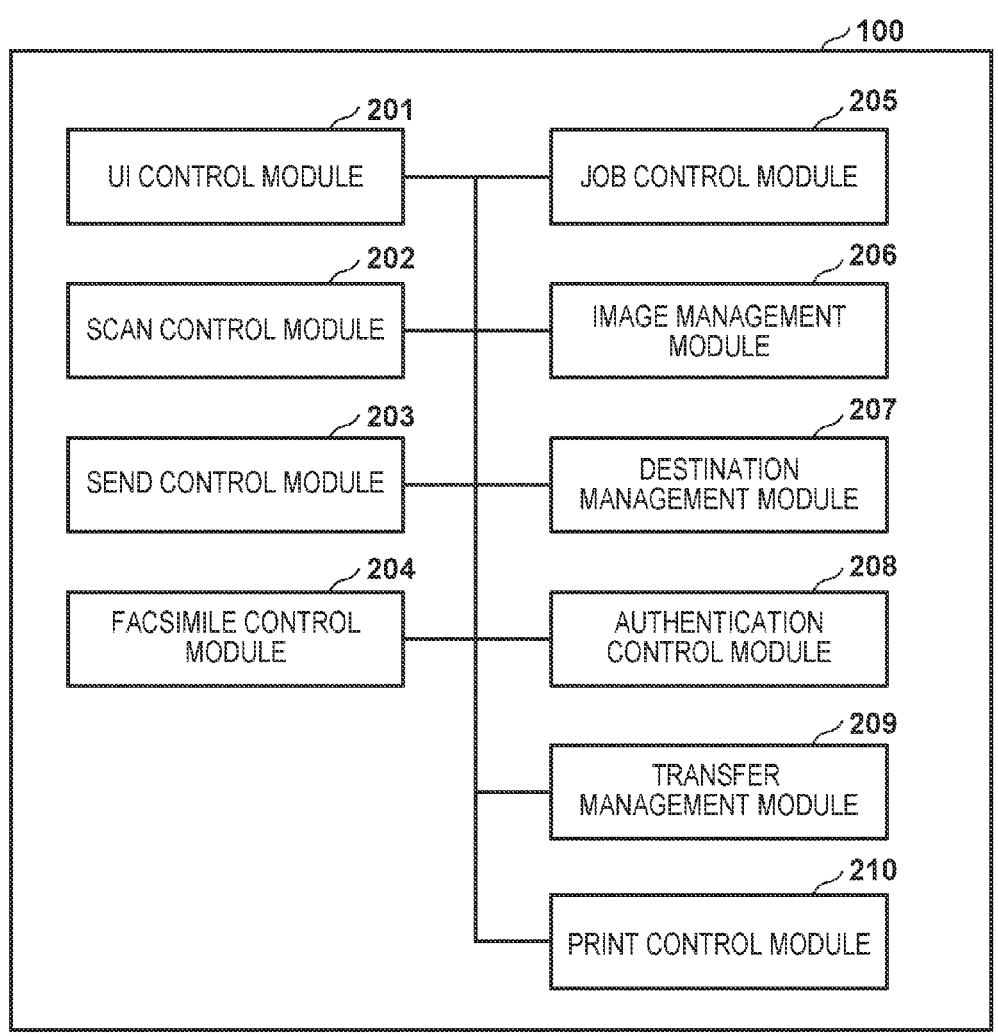
FIG. 2 is a functional block diagram for explaining a software configuration for controlling the multi-function peripheral according to the first embodiment.

FIG. 2 is a functional block diagram for explaining a software configuration for controlling the multi-function peripheral 100 according to the first embodiment.

A UI control module 201 displays an operation screen on the console unit 105 and controls a user interface (UI) for receiving an operation of a user. A scan control module 202 controls the scanner unit 104 and controls processing for reading an original. A send control module 203 controls processing for sending image data obtained under a control of the scan control module 202 to a destination designated by a user through a network interface 106. More specifically, the send control module 203 controls a transmission of the electronic mail, a transmission to a file server, and the like. A facsimile control module 204 controls transmission and reception of a G3 fax using the facsimile interface 107. A job control module 205 manages a request for transmission from a user received by the UI control module 201, and an execution status and history thereof. An image management module 206 manages information of image data obtained by the scanner unit 104 reading the original. A destination management module 207 manages destination information of transmission destinations used for transmission processing. An authentication control module 208 identifies a user that uses the multi-function peripheral 100 and manages information relating to the user based on the information read by the card reader 110. A transfer management module 209 manages a transfer condition for transferring document data to a designated transfer destination in accordance with the content of the received document data. A print control module 210 controls in such a way that the image forming unit 101 prints image data obtained by the scanner unit 104, a received fax document, a transmission result report, and the like. Note, a program for realizing these functions is stored in the memory 109, and the above described functions are achieved by the CPU 108 deploying the program into the RAM 111 and executing it.

Figure 3:
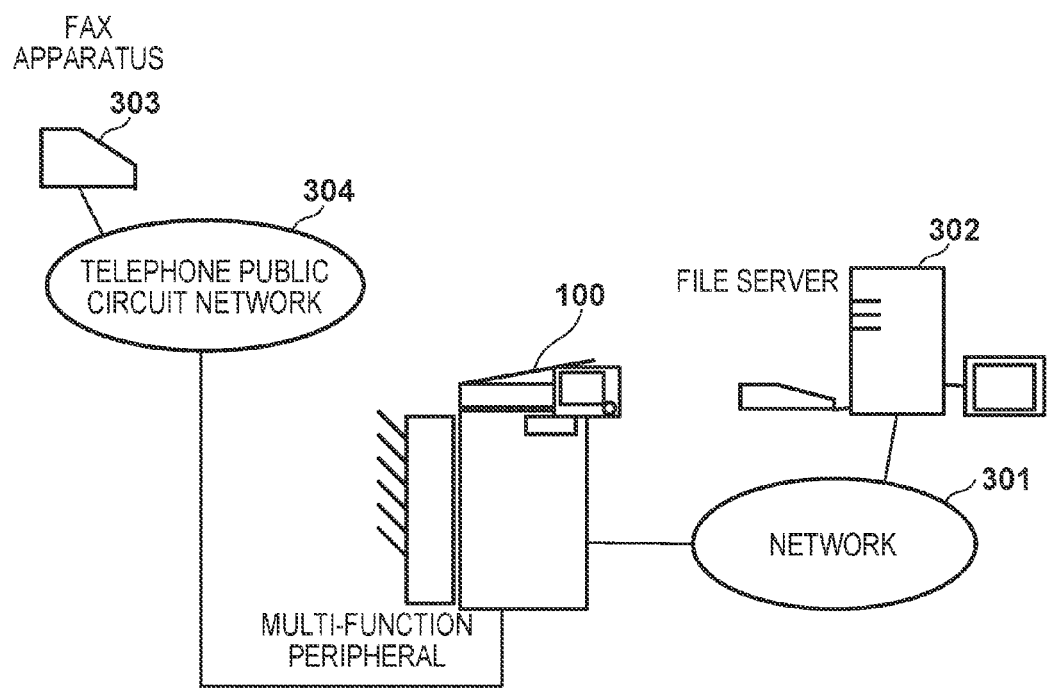
FIG. 3 depicts a view illustrating an example configuration of a system including the multi-function peripheral according to the first embodiment.

FIG. 3 depicts a view illustrating an example configuration of a system including the multi-function peripheral 100 according to the first embodiment.

A file server 302 is a transmission destination of image data obtained by the scanner unit 104 and is connected to the multi-function peripheral 100 through a network 301. A G3 fax apparatus 303 is connected to the multi-function peripheral 100 through a telephone public circuit network 304. A user can transmit a document or image data to a desired destination by designating a transmission destination and a detailed setting for when transmitting from a later explained operation screen of the multi-function peripheral 100.

FIG. 4 depicts a top view of the console unit 105 of the multi-function peripheral 100 according to the first embodiment.

A display unit 401 has a touch panel function, and is displaying application selection buttons (a menu screen) for calling operation screens in accordance with a user instruction. In this example, a "copy" button 406, a "scan" button 407, a "fax" button 408, and a "box" button 409 for respectively calling an operation screen of a copy function, a network scan function, a fax function, and a box function are displayed.

Also in the console unit 105, a numeric keypad 402, a start key 403 for instructing a job start, a "setting/registration" button 404 for calling a screen for setting the device, and a "history/status" button 405 for calling a job history/status screen are arranged. Note, other hardware keys, display buttons, and the like are included in the console unit 105, but here the view is illustrated omitting them.

FIG. 5 depicts a view illustrating an example of a scan operation screen displayed on the console unit 105 by a user pressing the "scan" button 407 in a screen of FIG. 4.

A user can designate a destination that becomes a transmission destination by touching an item in a destination input button area 501. The destination can be inputted using either "address book", "one-touch", or "new destination". When a user presses an "address book" button 504, an address book is displayed, and a desired destination can be selected from out of a plurality of destinations registered in the address book. A group of read setting buttons 502 are used for setting a read resolution for the scanner unit 104, color mode, and the like. In the example in FIG. 5, the settings are performed in such a way that the resolution is "300×300 dpi", the color mode is "full color", the document size is "auto", and the transmission data is "PDF". A special function button 503 is used for calling various detailed settings upon a reading of an original or upon transmission of the image data.

Figure 6A:
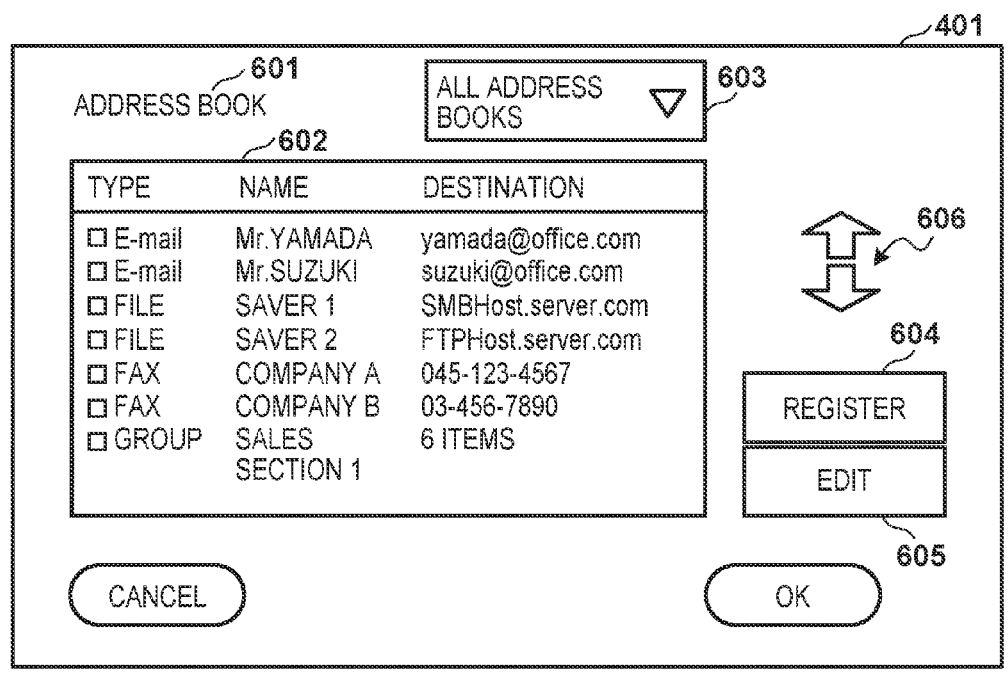
FIGS. 6A and 6B depict views respectively illustrating examples of a display screen of an address book displayed on the console unit of the multi-function peripheral according to the first embodiment.
Figure 6B:
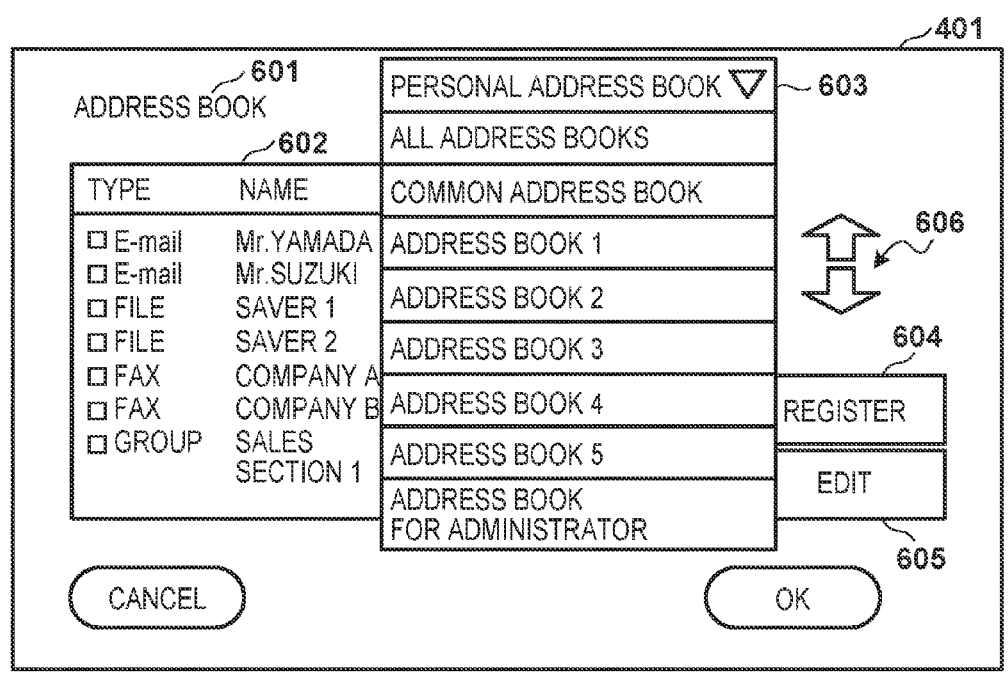

FIGS. 6A and 6B depict views respectively illustrating examples of a display screen of an address book displayed on the console unit 105 of the multi-function peripheral 100 according to the first embodiment.

FIG. 6A depicts a view illustrating an example of a display screen of an address book displayed on the console unit 105 by a user pressing the "address book" button 504 to instruct a reading out of the address book in the screen of FIG. 5.

Reference numeral 601 denotes a title of this screen and here it is "address book". A destination list 602 indicates a destination list registered in the address book. When all of a plurality of destinations registered in the address book cannot be displayed in the destination list 602, the display can be scrolled up/down using a scroll bar 606. A pull-down button 603 is a switching button of an address book for switching a target address book displayed on this screen. In the example of FIG. 6A, this is set to "all address books" for displaying all of the address books currently registered in the multi-function peripheral 100. A "registration" button 604 is a button for calling a screen for registering new destination information in the address book. An "edit" button 605 is a button for calling a screen for editing destination information that a user selects from the destination list 602.

FIG. 6B depicts a view illustrating an example of a state where a list of address books is displayed by a user making an instruction using the pull-down button 603 on the screen of FIG. 6A.

Here, as options for displaying address books, "all address books" for displaying destinations registered in all address books, "personal address book" which is an address book of an individual user, and "address book 1" to "address book 5" which are common address books are included. Also, an "address book for the administrator", which a user other than an administrator cannot edit and which the administrator can edit, is included. Note, configuration may be taken such that the "address book for the administrator" can be referred only by the administrator and cannot be referred by a user other than the administrator. In this case, configuration may be taken in such a way that a user other than the administrator cannot select the "address book for the administrator" from the pull-down button 603.

Figure 7:
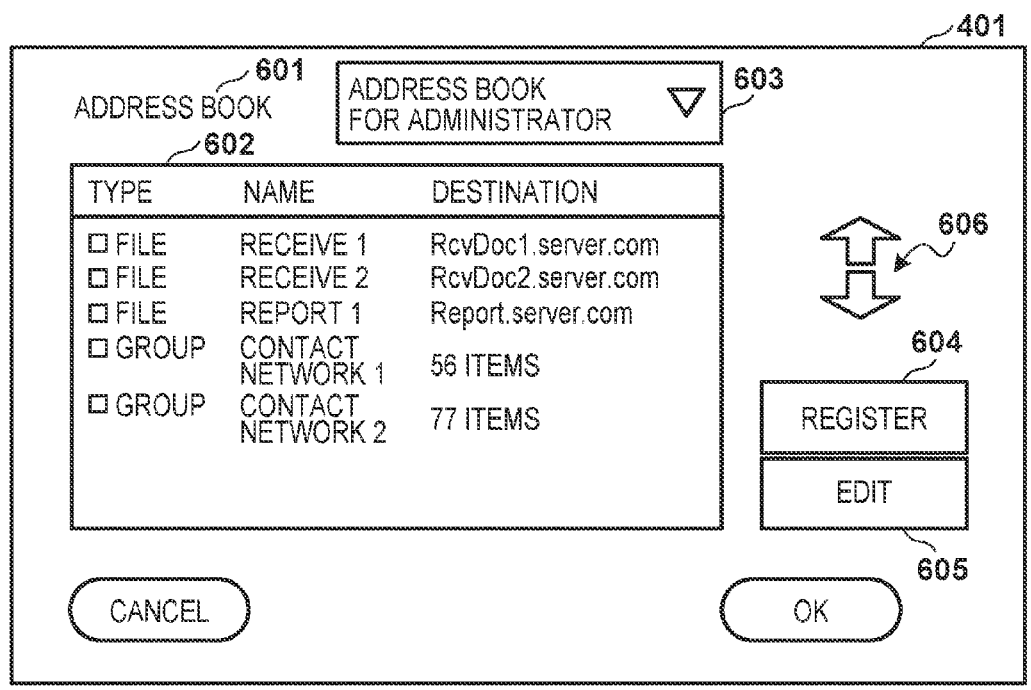
FIG. 7 depicts a view illustrating an example of the display screen of the address book displayed on the console unit when an "address book for the administrator" is selected from a pull-down button on the screen of FIG. 6B.

FIG. 7 depicts a view illustrating an example of the display screen of the address book displayed on the console unit 105 when "address book for the administrator" is selected from the pull-down button 603 on the screen of FIG. 6B. FIGS. 6A and 6B share common parts denoted by the same numerals.

A list of address books registered for "address book for the administrator" is displayed in the destination list 602. Also, in a case where an administrator authority is not given to the operating user, the "register" button 604 and the "edit" button 605 are displayed grayed out so that the user cannot operate them.

Figure 8:
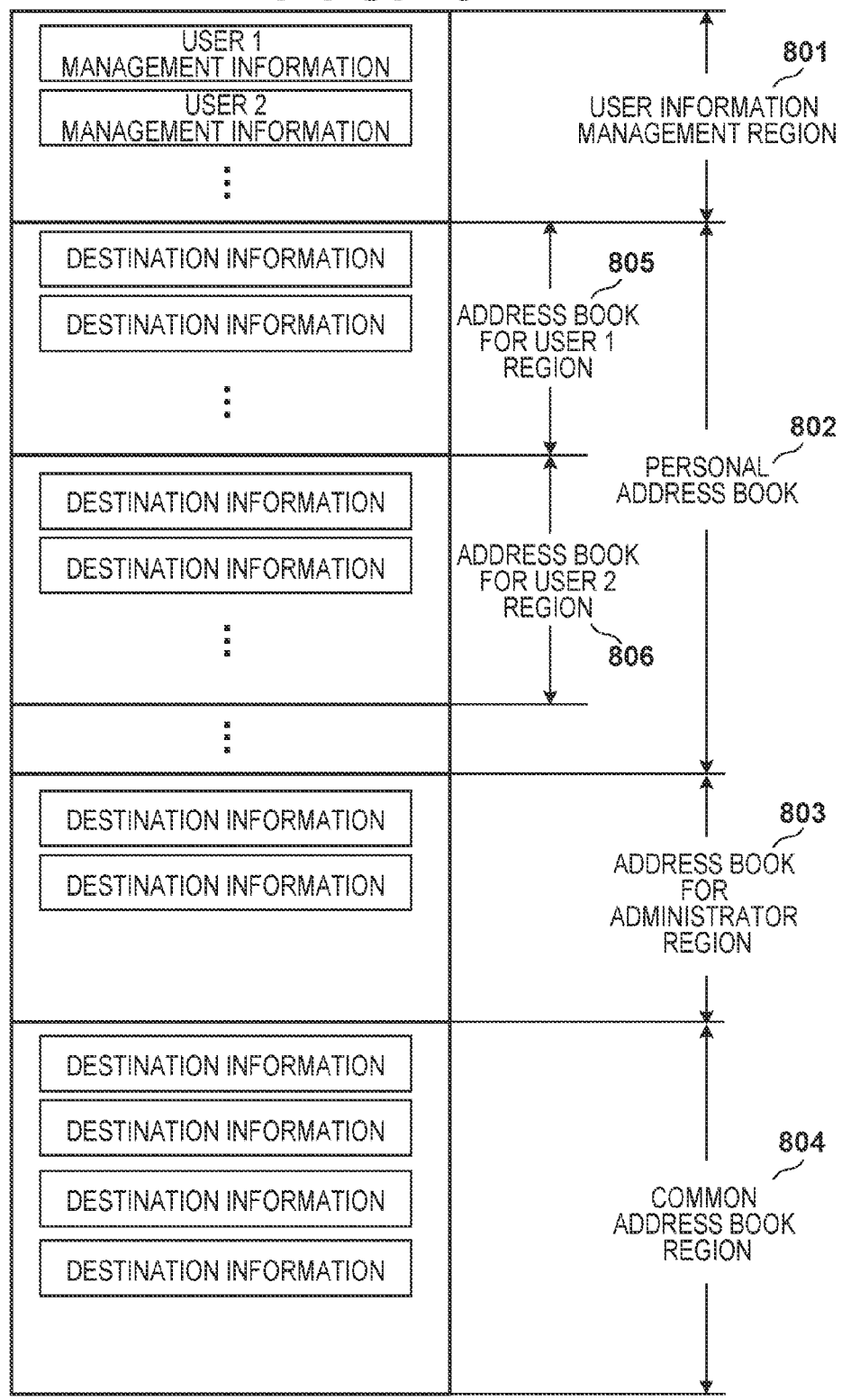
FIG. 8 depicts a view for describing an example of destination information managed by a destination management module, stored in a memory of the multi-function peripheral according to the first embodiment.

FIG. 8 depicts a view for describing an example of destination information managed by the destination management module 207, stored in the memory 109 of the multi-function peripheral 100 according to the first embodiment.

The destination information comprises a user information management region 801 for managing information of a user that uses the destination information, and a personal address book region 802 for storing destination information of each user. Also, an address book region 803 for the administrator for storing destination information which only the administrator can register or edit, and a common address book region 804 for storing destination information shared by users that use the device are included.

The personal address book region 802 is divided into address book regions dedicated for each user. In this example, an address book region 805 for user 1 for storing the destination information for the user 1 and, an address book region 806 for user 2 for storing the destination information for the user 2 are included.

Figure 9:
FIGS. 9A and 9B depict views illustrating an example of a screen for setting and a screen for registering a transfer destination displayed on a display unit of the console unit of the multi-function peripheral according to the first embodiment.

FIGS. 9A and 9B depict views illustrating an example of a settings screen and a registration screen of a transfer destination displayed on the display unit 401 of the console unit 105 of the multi-function peripheral 100 according to the first embodiment.

FIG. 9A depicts a view illustrating an example of a screen for setting a transfer destination displayed on the display unit 401 of the console unit 105 of the multi-function peripheral 100 according to the first embodiment. The screen is displayed when a user presses the setting/registration button 404 for calling the screen for setting the multi-function peripheral 100 on the screen of FIG. 4.

A transfer setting list 901 displays a list of transfer destinations registered in the multi-function peripheral 100 that are managed by the transfer management module 209 and stored in the memory 109. Also, a "register" button 902 is a button for instructing to open a screen for registering a new transfer destination.

FIG. 9B depicts a view illustrating an example of a setting registration screen of a transfer destination displayed when the "registration" button 902 of FIG. 9A is pressed.

When a user presses a "transfer destination setting" button 903 in the screen of FIG. 9B, the screen of the address book for the administrator which is illustrated in FIG. 7 is displayed.

Below, processing for displaying an address book corresponding to a display request of the address book by a user is explained using a flowchart in FIG. 10.

Figure 10:
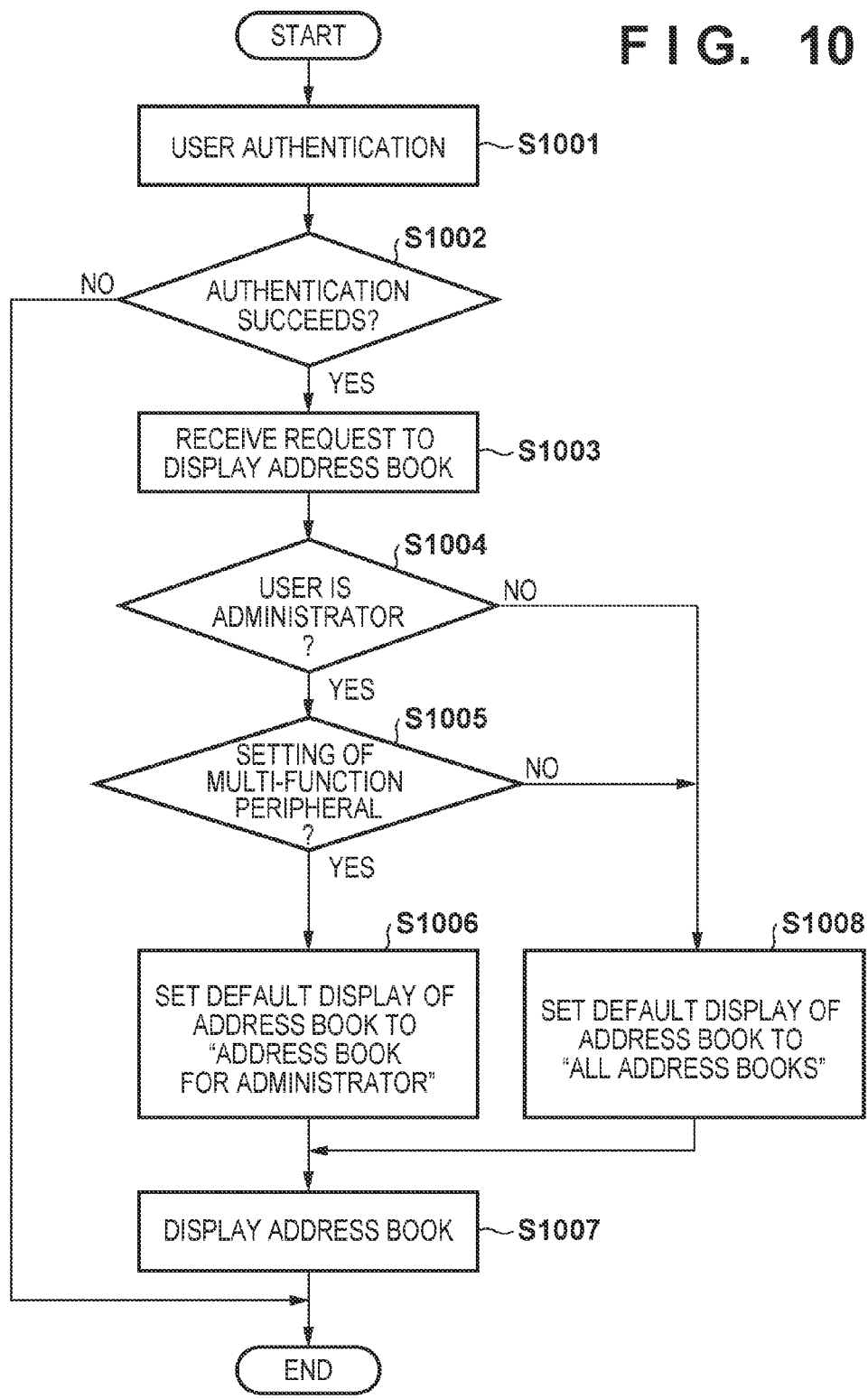
FIG. 10 is a flowchart for describing processing for displaying the address book in the multi-function peripheral according to the first embodiment.

FIG. 10 is a flowchart for describing processing for displaying an address book in the multi-function peripheral 100 according to the first embodiment. Note, the processing explained by this flowchart is achieved by a program for executing the processing being stored in the memory 109, and being deployed into the RAM 111 upon execution and being executed under the control of the CPU 108.

This process is initiated by the user holding a card for authentication of the user up to the card reader 110 or inputting a user name and a password in the user authentication screen displayed on the console unit 105, and the CPU 108 performs a user authentication using this information in step S1001. Next, the processing proceeds to step S1002 and the CPU 108 determines whether or not the user is able to use this device, that is, the CPU 108 determines whether or not the user authentication has succeeded. Here, if the user authentication has failed, the processing is simply terminated. On the other hand, when it is determined that the user authentication has succeeded, the processing proceeds to step S1003, and the CPU 108 receives a request to display the address book by the user from the console unit 105. For example, this corresponds to a case where the "address book" button 504 is pressed on the operation screen illustrated in FIG. 5 or a case where the "transfer destination setting" button 903 is pressed on the screen for setting transfer destinations in FIG. 9B.

When the request to display the address book is received, the processing proceeds to step S1004, and the CPU 108 determines whether or not the user authenticated in step S1001 is the administrator. Here, if the user is determined to be the administrator, the processing proceeds to step S1005, otherwise, the processing proceeds to step S1008. In step S1005, the CPU 108 determines whether the display request of the address book received in step S1003 is for a user transmitting data by operating the multi-function peripheral 100, or for a device setting to the multi-function peripheral 100, for example, setting of the transfer destination. More specifically, the CPU 108, in step S1005, determines whether the request to display the address book is received by the "address book" button 504 on the operation screen of FIG. 5, or received by the "transfer destination setting" button 903 on the screen for setting transfer destinations in FIG. 9B. In a case where it is determined that the display request of the address book is received by the "address book" button 504 on the operation screen in FIG. 5, it is for the user operating the multi-function peripheral 100 to transmit based on a user instruction. Therefore, the CPU 108 makes the process proceed to step S1008. On the other hand, in a case where it is determined that the request to display the address book is received by the "transfer destination setting" button 903 on the screen for setting transfers destination in FIG. 9B, it is a setting of the multi-function peripheral 100. Therefore, the CPU 108 advances the process to step S1006.

In step S1006, the CPU 108 sets an initial value of the address book display to "address book for the administrator". Then, the processing proceeds to step S1007 and the CPU 108 sets an initial setting of the display target address book to "address book for the administrator", displays the address book for the administrator on the console unit 105, for example, as shown in FIG. 7, and terminates this processing.

On the other hand, in a case where the CPU 108 advances the processing to step S1008, it sets an initial value of the address book display to "all address books" to display all of the registered destination lists, and the processing proceeds to step S1007. Then, in step S1007, the CPU 108 sets the initial setting of the address book of the display target to "all address books", and displays all of the registered address books on the console unit 105, for example, as shown in FIG. 6A, and this process is terminated.

With this, in a case where the user, for example, presses the address book button 504 for setting the transmission destination of scanned image data from the scan operation screen in FIG. 5, a list of "all address books" is displayed initially as shown in FIG. 6A. Alternatively, in a case where the "transfer destination setting" button 903 is pressed to make a transfer setting of the multi-function peripheral 100 on the operation screen in FIG. 9B, the a list of "address books for the administrator" is displayed initially as shown in FIG. 7.

Figure 11:
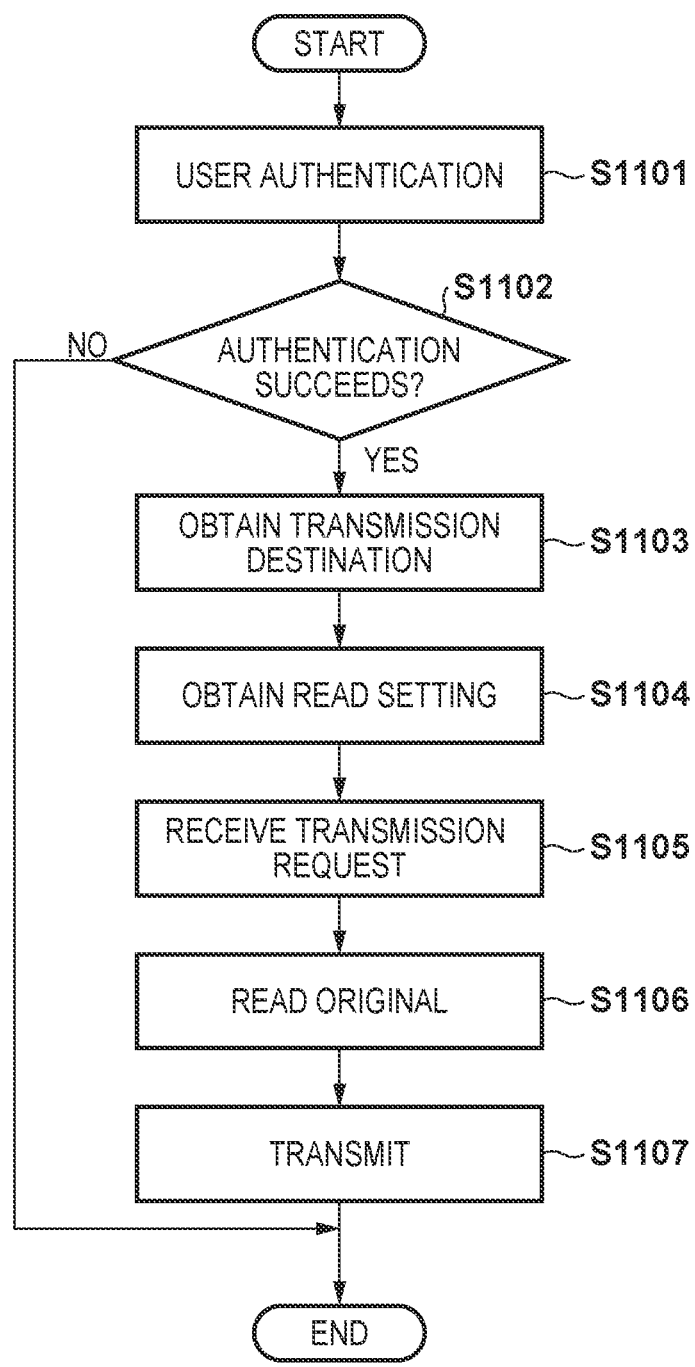
FIG. 11 is a flowchart for describing a process of the multi-function peripheral according to the first embodiment for reading an original and transmitting image data to a destination designated by a user.

FIG. 11 is a flowchart for describing a process of the multi-function peripheral 100 according to the first embodiment for reading an original and transmitting image data to a destination designated by a user. Note, the processing illustrated by this flowchart is achieved by a program for executing the processing being stored in the memory 109, and being deployed into the RAM 111 upon execution and being executed under the control of the CPU 108.

In step S1101 and step S1102, a user authentication is performed similarly to previously described step S1001 and step S1002 in FIG. 10. When the user authentication succeeds in step S1102, the processing proceeds to step S1103, the CPU 108 obtains a transmission destination selected or inputted by the user operating, for example, one-touch button or new destination button of the destination input buttons area 501 in FIG. 5. Next the processing proceeds to step S1104, the CPU 108 obtains reading settings by the scanner unit 104 set by, for example, the group of read setting buttons 502 in FIG. 5. Next the processing proceeds to step S1105, the CPU 108 determines whether or not the start key 403 on the console unit 105 is pressed, and a transmission request is received, where configuration is such that a transmission request is made if it is determined that the start key 403 is pressed. Then the processing proceeds to step S1106, the CPU 108 controls the scanner unit 104, reads an original according to reading settings obtained in step S1104, and the processing proceeds to step S1107, the CPU 108 transmits image data obtained by reading the original to the transmission destination received in step S1103, and completes the processing.

FIG. 12 is a flowchart for describing a process for transferring to a designated transfer destination document data received by the multi-function peripheral 100 according to the first embodiment. Note, the processing illustrated by this flowchart is achieved by a program for executing the processing being stored in the memory 109, and being deployed into the RAM 111 upon execution and being executed under the control of the CPU 108.

Firstly, in step S1201, when the CPU 108 receives an incoming call of a fax document through the facsimile interface 107, the CPU 108 receives and stores in the memory 109 the transmitted facsimile document data. Next the processing proceeds to step S1202, the CPU 108 determines whether or not it is necessary to transfer the document data by referring to the transfer setting. In step S1203, the CPU 108 refers to the received document data and the set transfer setting, and determines whether or not it is necessary to transfer the received document data. Here, if it is determined that a transfer is not necessary, the processing proceeds to step S1206, the document data is printed using the image forming unit 101, and the processing is terminated. On the other hand, if it is determined that it is necessary to transfer the document data, the processing proceeds to step S1204, and the CPU 108 obtains a transfer destination for transferring the document data from the referenced transfer setting. Then, the processing proceeds to step S1205, and the CPU 108 transmits the document data to the obtained transfer destination, and terminates the processing.

By the first embodiment, as explained above, when an address book is displayed for a user to set a transmission destination for sending data from the multi-function peripheral, "all address books", which is a wider selection range of the transmission destinations, is displayed initially. On the other hand, for example, in a case where the administrator performs a transfer setting on the apparatus, "address book for the administrator", in which destinations are limited, is displayed initially. With this, because an appropriate initial screen of the address book can be presented in accordance with a purpose of an operation of a user operating the multi-function peripheral 100, an effect that the user operability is improved is achieved. Note, after initial display in the display screen of the address book in FIGS. 6A and 6B or FIG. 7, a user or the administrator can cause another address book to be displayed by the pull-down button 603.

Note that in the first embodiment, explanation was given for an example in which, in step S1005, it is determined whether the request to display the address book is received by the "address book" button 504 on the operation screen of FIG. 5, or received by the "transfer destination setting" button 903 on the screen for setting transfer destinations in FIG. 9B. However, as the present invention is not limited to this, a configuration may be taken such that the CPU 108 determines through which screen a display request of address book is received. Specifically, configuration may be taken such that the CPU 108 determines a setting of a user transmitting data when reception is performed through the scan operation screen in FIG. 5, and determines a device setting when reception is performed through the display screen of the address book in FIG. 7.

Second Embodiment

In the previously described first embodiment, an example where the initial screen of the address book is switched in accordance with to the purpose of the operation of a user that selects the transmission destination is explained. Operability can be further improved with respect to this by presenting an appropriate address book to the user in accordance with the purpose of the operation of the user when a user registers a transmission destination to an address book. Below, this example is explained in the second embodiment. Note, the hardware configuration and the system configuration of the multi-function peripheral 100 according to the second embodiment are same as in the case of the previously described first embodiment, so the explanation thereof is omitted.

Figure 13A:
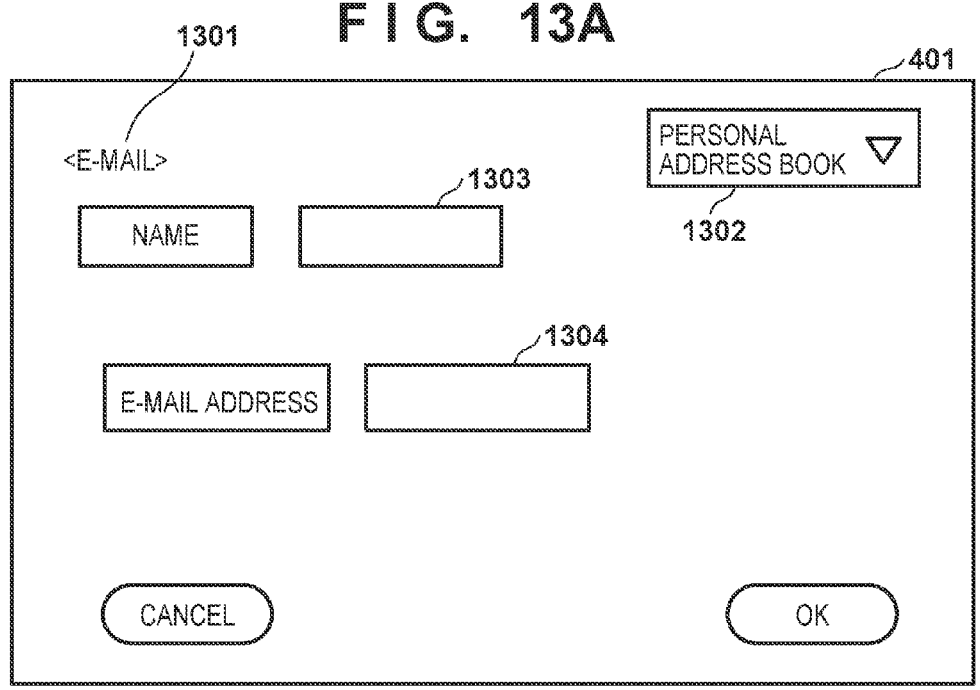
FIGS. 13A and 13B depict views respectively illustrating examples of a screen for registering a destination of an electronic mail displayed on a display unit of the console unit of the multi-function peripheral according to a second embodiment.
Figure 13B:
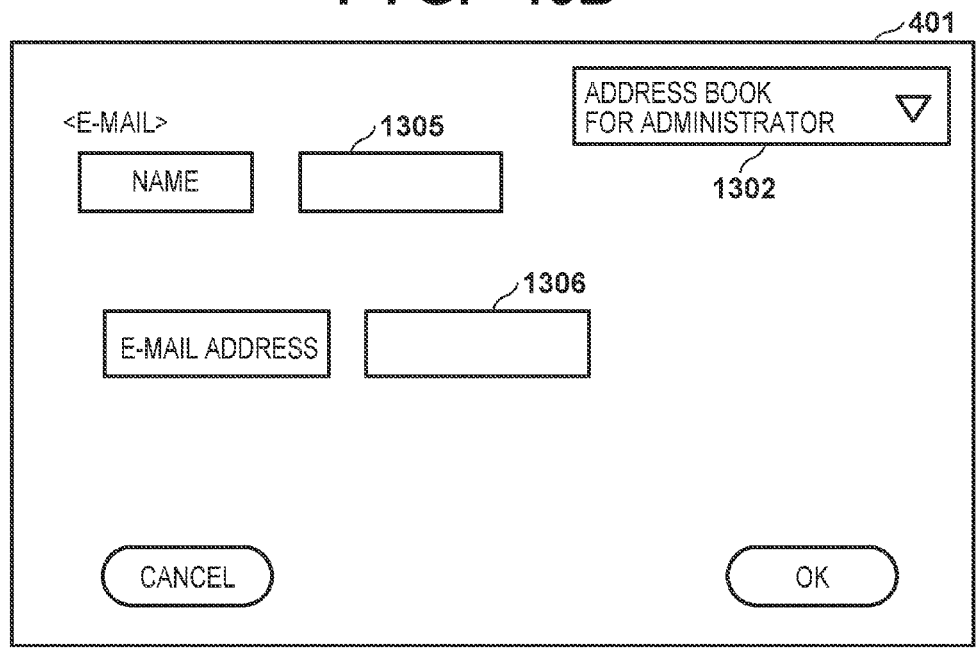

FIGS. 13A and 13B depict views illustrating examples of a screen for registering a destination of an electronic mail displayed on the display unit 401 of the console unit 105 of the multi-function peripheral 100 according to the second embodiment. This screen is displayed by the user pressing the address book "register" button 604 on the screen of FIG. 6A or FIG. 6B and selecting an electronic mail as a registration destination protocol.

FIG. 13A depicts a view illustrating an example of an electronic mail destination registration screen for when "the personal address book" is selected as a registration destination address book. In FIG. 13A, reference numeral 1301 denotes a title of this screen. A pull-down button 1302 is an address book switching pull-down for selecting a registration destination address book, and here "personal address book" is selected.

Here, similarly to when selecting a destination as explained in FIG. 6B, the user can display a list of the address books by operating an address book switching pull-down button 1302, and can select a desired address book from out of the list. Here the displayed list of the address books includes all address books, a personal address book, a common address book, address books 1-5, address book for the administrator same as previously described FIG. 6B. However, the address book for the administrator becomes non-displayed in a case where the operating user does not have an administrator authority.

In FIG. 13A, the personal address book is selected in the pull-down button 1302, a destination name input field 1303 registered to the personal address book and an electronic mail address input region 1304 for a transmission destination are displayed.

FIG. 13B depicts a view illustrating an example of an electronic mail destination registration screen in which "address book for the administrator" is selected as a registration destination address book.

Note, for one example of being able to register destination, an example of a destination of an electronic mail is illustrated, but a registration screen of a transmission destination to a file server and a registration screen of a fax transmission destination can be similarly switched by operating an address book switching pull-down button 1302. In FIG. 13B as well, a destination name input field 1305 registered to the address book for the administrator and a transmission destination electronic mail address input region 1306 are displayed.

Next, a process for registering a designated destination in accordance with a registration request for a user to register a transmission destination to an address book is explained with reference to a flowchart in FIG. 14.

Figure 14:
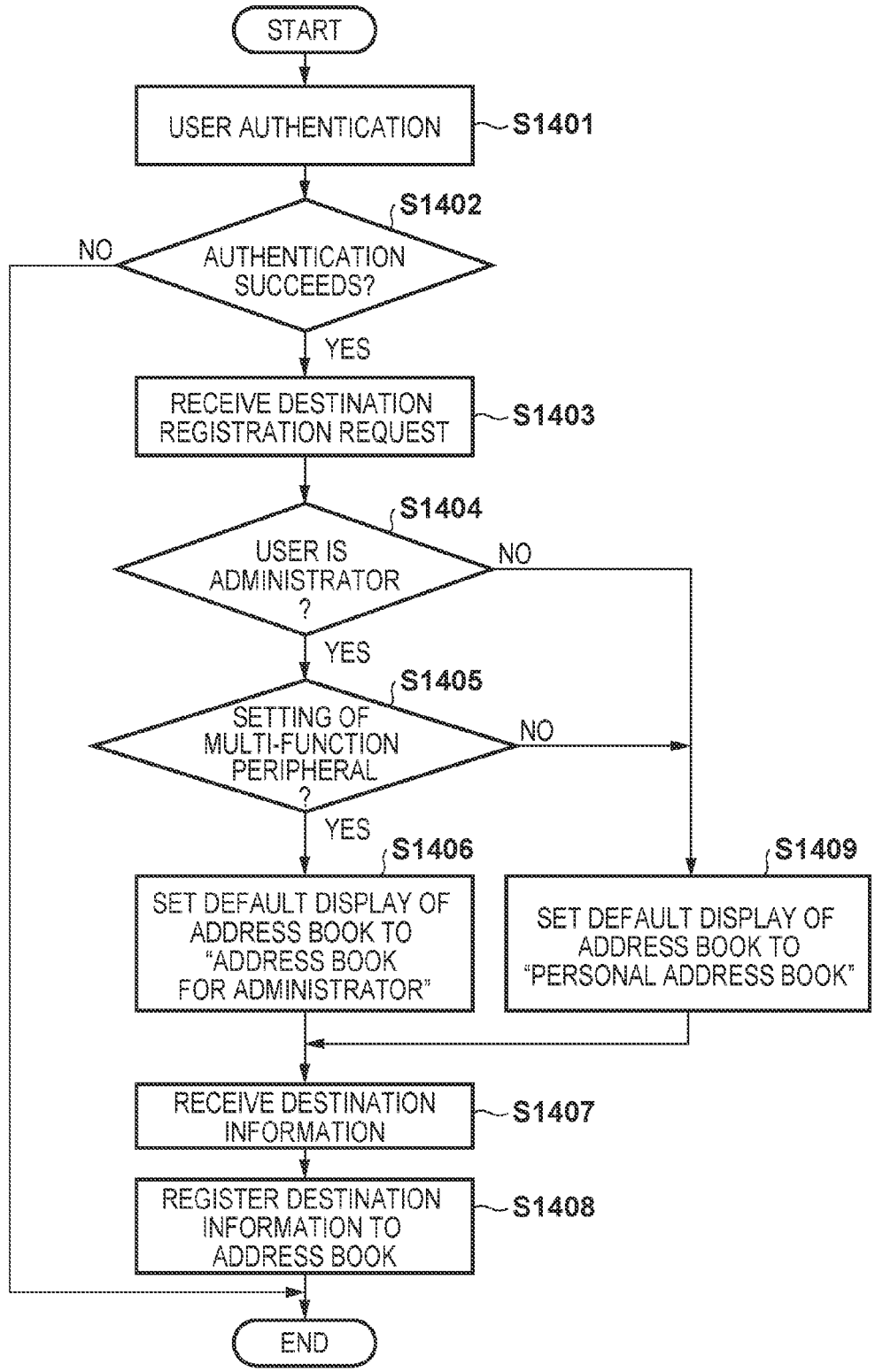
FIG. 14 is a flowchart for describing processing for registering a destination in the address book in the multi-function peripheral according to the second embodiment.

FIG. 14 is a flowchart for describing processing for registering a destination in the address book in the multi-function peripheral 100 according to the second embodiment. Note, the processing illustrated by this flowchart is achieved by a program for executing the processing being stored in the memory 109, and being deployed into the RAM 111 upon execution and being executed under the control of the CPU 108.

Firstly, in step S1401, the user holds a card for user authentication up to the card reader 110 or inputs a user name and a password in the user authentication screen displayed on the console unit 105. With this, the CPU 108 performs a user authentication using the inputted information. In step S1402, the CPU 108 determines whether or not the user authentication succeeded, that is, determines whether or not it is possible for the user to use the multi-function peripheral 100. Here, if the user authentication succeeds, the processing proceeds to step S1403, otherwise this process is terminated.

In step S1403, the CPU 108 receives a destination registration request of the address book from the user. The destination registration is determined to be required by the user, for example, pressing the "registration" button 604 in the screen of FIG. 6A or FIG. 7, and then selecting a registered transmission protocol in a screen (not shown). When the request to register a destination is received like this, the processing proceeds to step S1404, and the CPU 108 determines whether or not the user authenticated in step S1401 is the administrator. Here, if the user is determined to be the administrator, the processing proceeds to step S1405, otherwise, the processing proceeds to step S1409. In step S1405, the CPU 108 determines whether the destination registration request received in step S1403 is for the user to transmit by operating the multi-function peripheral 100, or is a setting to the device for a transfer transmission performed by the multi-function peripheral 100. That is, for example, in a case where the user presses the "address book" button 504 on the scan operation screen in FIG. 5 and instructs a destination registration using the registration button 604, it is determined to be for the user to transmit by operating the multi-function peripheral 100 based on a user instruction. On the other hand, for example, in a case where the "registration" button 902 on the transfer setting screen in FIG. 9A is instructed by opening an address book, it is determined to be a setting for the multi-function peripheral 100 to transmit. If it is determined to be a setting for the multi-function peripheral in step S1405, the processing proceeds to step S1406, otherwise the processing proceeds to step S1409. Note, the determination in step S1405 may be performed depending on a button instructing the destination registration or a kind of screen where the button is pressed, similarly to the first embodiment.

In step S1406, the CPU 108 sets initial display of the registration destination address books to "address books for the administrator", for example, as shown in FIG. 7, and the processing proceeds to step S1407. On the other hand, in step S1409, the CPU 108 sets the initial display of the registration destination address books to "personal address book" which include address books for respective users, for example, as shown in FIG. 6A, and the processing proceeds to step S1407. In step S1407, the CPU 108 displays the registration screen making the address book set in step S1406 or in step S1409 the registration destination address book, and receives destination information input by the user such as a registration destination, a destination name, a transmission destination address, and the like. In this way, when the destination information is received, the processing proceeds to step S1408, the CPU 108 registers the received destination information to the designated address book, and terminates this process.

By the second embodiment, as explained above, in a case where a user presses the address book button in order to register a destination from a scan operation screen, "personal address book" is displayed initially as shown in FIG. 13A, for example. On the other hand, in a case where the "transfer destination setting" button 903 in FIG. 9B is pressed to setting a transfer destination for the multi-function peripheral 100, for example, the "address book for the administrator" is displayed initially as shown in FIG. 13B, for example.

In this way, according to the second embodiment, the registration target address book can be displayed switching automatically in correspondence with a case where a user registers a personal address to the address book, or a case where the administrator sets the transfer destination for the apparatus to the address book. With this, the effort of a user selecting an address book to which a destination is to be registered can be eliminated, and an occurrence of a situation where a user mistakenly registers a destination to an unintentional address book can be prevented.

Third Embodiment

In the previously described first embodiment, an example where the initial screen of the address book is switched in accordance with the purpose of the user selecting the transmission destination is explained. However, it can be considered that the displayed address book will be limited in accordance with the operation of the user from the perspective of security or the like, so explanation of the third embodiment is given for handling this. Note, the hardware configuration and the system configuration of the multi-function peripheral 100 according to the third embodiment are same as in the case of the previously described first embodiment, so the explanation thereof is omitted.

Figure 15:
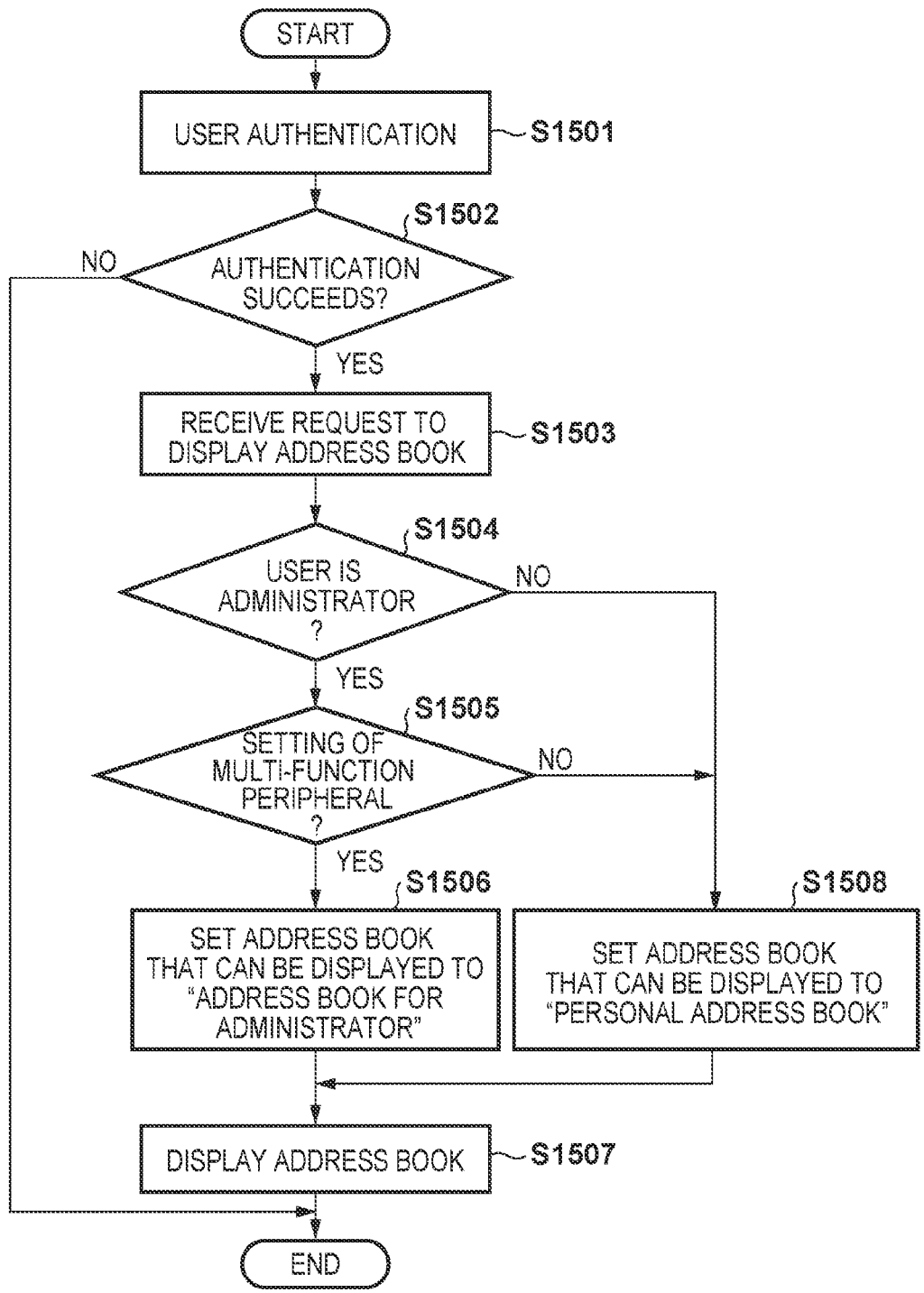
FIG. 15 is a flowchart for describing processing for displaying the address book in the multi-function peripheral according to a third embodiment.

FIG. 15 is a flowchart for describing processing for displaying an address book in the multi-function peripheral 100 according to the third embodiment. Note, the processing illustrated by this flowchart is achieved by a program for executing the processing being stored in the memory 109, and being deployed into the RAM 111 upon execution and being executed under the control of the CPU 108.

Processes of step S1501-step S1505 in FIG. 15 are the same with those of step S1001-step S1005 in FIG. 10, so the explanation is omitted. In step S1505, the CPU 108 determines whether a request to display an address book received in step S1503 is for a user to transmit as an operator or for setting the device for transmission performed by the device. In step S1505, if the CPU 108 determines that it is a device setting for the multi-function peripheral 100, the processing proceeds to step S1506, the CPU 108 limits to the address books that can be displayed to "address book for the administrator", and the processing proceeds to step S1507. Here, in a case where the address book that can be displayed is limited to "address book for the administrator", the display is not allowed to be switched to an address book other than "address book for the administrator". For example, configuration may be such that the items of the address book other than "address book for the administrator" are grayed out and cannot be selected by the pull-down button 603 in FIG. 6B.

On the other hand, if the user is not the administrator in step S1504, or, if it is determined in step S1505 that it is an selection of an address for transmission by the user operating the multi-function peripheral 100, the processing proceeds to step S1508. In step S1508, the CPU 108 limits the address book that can be displayed to "the personal address book", and the processing proceeds to step S1507. Then, in step S1507, the CPU 108 displays the address book set in step S1506 or in step S1508 on the console unit 105. Here, in a case where the address book that can be displayed is limited to "personal address book", the display is not allowed to be switched to an address book other than "personal address book". For example, configuration may be such that the items of the address book other than "personal address book" are grayed out and cannot be selected by the pull-down button 603 in FIG. 6B.

Note, in the third embodiment, an example is explained in which an address book displayed when selecting a destination is limited, but the displayed address book may be switched in accordance with the purpose of the operation of the user similarly when a destination is registered to the address book.

By virtue of the third embodiment, in a case where a user is not the administrator, or when registering in the address book a destination for transmitting by a user operating the device, a personal address book of the authenticated user is displayed. With this, compared to cases where all address books are displayed to the user as with the embodiments described previously, there is the effect that a leak of an address book or an incorrect editing can be prevented from being performed.

Fourth Embodiment

An operator of the multi-function peripheral 100 is not the sender, and there are cases where the multi-function peripheral 100 notifies, using an electronic mail, to a user the termination of a job, and the multi-function peripheral 100 notifies to a user a URL of a save destination at which a document is saved when the multi-function peripheral 100 saves the document. In this way, in a case where the multi-function peripheral 100 notifies the result of the performed process to the user, it is often the case that the operator is the recipient. Accordingly, in a case where the multi-function peripheral 100 notifies the result of the performed process to the user, it is thought operability is better if the display of the address book is not "address book for the administrator". Therefore, in the fourth embodiment, the problem is solved by making the display of the address book in a case where the multi-function peripheral 100 notifies the result of a performed process to the user "all address books". Note, the hardware configuration and the system configuration of the multi-function peripheral 100 according to the fourth embodiment are same as in the case of the previously described first embodiment, so the explanation thereof is omitted.

FIG. 16 is a flowchart for describing processing for displaying an address book in the multi-function peripheral 100 according to the fourth embodiment. Note, the processing illustrated by this flowchart is achieved by a program for executing the processing being stored in the memory 109, and being deployed into the RAM 111 upon execution and being executed under the control of the CPU 108.

Processes of step S1601-step S1605 in FIG. 16 are the same with those of step S1001-step S1005 in FIG. 10, so the explanation is omitted. In step S1606, the CPU 108 determines whether or not it is a case where the multi-function peripheral 100 notifies the result of a performed process to the user. Here, for example, it is determined whether or not it is a case where the user presses the "special function" button 503 on the scan operation screen in FIG. 5 and sets the destination for notifying the termination of the job. In step S1606, if the CPU 108 determines that it is a case for setting the destination when the multi-function peripheral 100 notifies the result of the performed process to the user, the processing proceeds to step S1609, the CPU 108 sets the displayed address book to the user-dedicated "all address books", and the processing proceeds to step S1608. On the other hand, if it is determined in step S1606 that it is not the setting of the destination for notifying the result of the processing, the processing proceeds to step S1607, the CPU 108 sets the displayed address book to "address book for the administrator", and the processing proceeds to step S1608. In step S1608, the CPU 108 displays the address book set in step S1607 or in step S1609 on the console unit 105 as the initial display, and terminates the processing.

Note, in the fourth embodiment, even in a case where an operator is not a sender but the multi-function peripheral selects the destination to transmit, when the notification destination of the result of the processing is set, it is not "address book for the administrator" but "all address books". With this, the address book with the broader selection range can be presented to the user, and the operability of the user can be increased. This is because when the multi-function peripheral 100, for example, notifies using an electronic mail to the user the termination of a job, there is a high possibility that the user's address is stored not in the address book for the administrator, but in the general address book.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-097705, filed May 12, 2015 which is hereby incorporated by reference herein in its entirety.

What is claimed is:

1. An image processing apparatus comprising:
a scanner that reads an original, wherein the image processing apparatus has a transmission function for transmitting image data corresponding to the original read by the scanner;
a storage device that stores a plurality of address books including at least an address book for an administrator;
a memory storing instructions, and
a processor executing the instructions causing the image processing apparatus to:
authenticate a user of the image processing apparatus;
display, as a default, address information included in the plurality of address books stored in the storage device, if a request to display an address book is received from the authenticated user and the authenticated user does not have an administrator authority;
display, as a default, address information included in the plurality of address books stored in the storage device, if a request to display an address book is received via a first screen related to the transmission function from the authenticated user and the authenticated user has the administrator authority;
display, as a default, address information included in the address book for the administrator to select a transfer destination if a request to display an address book is received via a second screen different from the first screen from the authenticated user and the authenticated user has the administrator authority; and
control for automatically transferring image data received from an external apparatus to the selected transfer destination.

2. The image processing apparatus according to claim 1, wherein the address book for the administrator is able to be edited by a user having the administrator authority, and is not able to be edited by a user that does not have the administrator authority.

3. The image processing apparatus according to claim 1, wherein the address book for the administrator is able to be referenced by a user having the administrator authority, and is not able to be referenced by a user that does not have the administrator authority.

4. The image processing apparatus according to claim 1, wherein the plurality of address books stored by the storage device further include an address book for a user.

5. The image processing apparatus according to claim 1, wherein the plurality of address books stored by the storage device further include a common address book.

6. The image processing apparatus according to claim 1, wherein the instructions further cause the image processing apparatus to:
display, as the default, address information included in the plurality of address books stored in the storage device if a request to display an address book to select a destination of a result of the processing is received and the authenticated user has the administrator authority.

7. The image processing apparatus according to claim 1, wherein the plurality of address books stored in the storage device includes a personal address book corresponding a user, and
wherein the instructions further cause the image processing apparatus to display, as the default, address information included in a personal address book of the authenticated user in a case that a request to register address information is received and the authenticated user does not have the administrator authority.

8. A method of controlling an image processing apparatus having a transmission function for reading an original and transmitting image data of the read original, and a transfer function for receiving image data from an external apparatus and transferring the received image data, the method comprising:
storing in a storage device a plurality of address books including at least an address book for an administrator;
authenticating a user of the image processing apparatus;
displaying, as a default, address information included in the plurality of address books stored in the storage device, if a request to display an address book is received from the authenticated user and the authenticated user does not have an administrator authority;
displaying, as a default, address information included in the plurality of address books stored in the storage device, if a request to display an address book is received via a first screen related to the transmission function from the authenticated user and the authenticated user has the administrator authority;
displaying, as a default, address information included in the address book for the administrator to select a transfer destination if a request to display an address book is received via a second screen different from the first screen from the authenticated user and the authenticated user has the administrator authority; and
controlling for automatically transferring image data received from an external apparatus to the selected transfer destination.

9. A non-transitory computer-readable storage medium storing a program for causing a computer to execute a method of controlling an image processing apparatus having a transmission function for reading an original and transmitting image data of the read original, and a transfer function for receiving image data from an external apparatus and transferring the received image data, the program comprising:
a code for storing, by the computer, in a storage device a plurality of address books including at least an address book for an administrator;
a code for authenticating, by the computer, a user of the image processing apparatus;
a code for displaying, by the computer, as a default, address information included in the plurality of address books stored in the storage device, if a request to display an address book is received from the authenticated user and the authenticated user does not have an administrator authority;
a code for displaying, as a default, address information included in the plurality of address books stored in the storage device, if a request to display an address book is received via a first screen related to the transmission function from the authenticated user and the authenticated user has the administrator authority;
a code for displaying, by the computer, as a default, address information included in the address book for the administrator to select a transfer destination if a request to display an address book is received via a second screen different from the first screen from the authenticated user and the authenticated user has the administrator authority; and
a code for controlling, by the computer, for automatically transferring image data received from an external apparatus to the selected transfer destination.

* * * * *